United States Patent [19]

Egelhof

[11] Patent Number: 5,011,576
[45] Date of Patent: Apr. 30, 1991

[54] BREAST BOX NOZZLE FOR A PAPER MACHINE

[75] Inventor: Dieter Egelhof, Heidenheim, Fed. Rep. of Germany

[73] Assignee: J. M. Voith GmbH, Heidenheim, Fed. Rep. of Germany

[21] Appl. No.: 529,780

[22] Filed: May 25, 1990

Related U.S. Application Data

[63] Continuation of Ser. No. 311,938, Feb. 16, 1989, abandoned.

[30] Foreign Application Priority Data

Feb. 17, 1988 [DE] Fed. Rep. of Germany ....... 3804827

[51] Int. Cl.⁵ .............................................. D21F 1/02
[52] U.S. Cl. .................................... 162/344; 162/272
[58] Field of Search ............... 162/336, 344, 347, 258, 162/272

[56] References Cited

U.S. PATENT DOCUMENTS

| | | | |
|---|---|---|---|
| 1,563,095 | 11/1925 | Lewthwaite | 162/208 |
| 2,255,951 | 9/1941 | Tomhund | 162/336 |
| 2,716,927 | 9/1955 | Sullivan | 162/252 |
| 3,547,775 | 12/1970 | Bossen et al. | 162/258 |
| 4,326,916 | 4/1982 | Flaig et al. | 162/344 |
| 4,406,740 | 9/1983 | Brieu | 162/259 |
| 4,683,027 | 7/1987 | Pitkajarvi | 162/336 |

FOREIGN PATENT DOCUMENTS 270227 4/1913 Fed. Rep. of Germany ...... 162/336

Primary Examiner—Karen M. Hastings
Attorney, Agent, or Firm—Charles W. Grimes

[57] ABSTRACT

The breast box nozzle comprises a nozzle-type pulp stock duct formed by stream-guiding walls of the same width as the machine. The pulp stock duct is limited at its pulp stock discharge gap by a surface which extends over the width of the machine and is not touched by the pulp stock. Deposits in the area of the breast box nozzle which are caused by spray mists may cause defects in basis weight/cross section of the web being produced.

The precipitation of the spray mist on the surface not touched by the pulp stock is prevented by a device which discharges a gaseous fluid into the space lying in front of this surface.

2 Claims, 2 Drawing Sheets

BREAST BOX NOZZLE FOR A PAPER MACHINE

This is a continuation of copending application Ser. No. 07/311,938, filed on Feb. 16, 1989, now abandoned.

The invention relates to a breast box nozzle for a paper machine or the like comprising a nozzle-like pulp stock duct having a width as wide as the machine to form a pulp stock discharging gap as wide as the machine, the duct being limited by a first, preferably rigid, stream-guiding wall which is as wide as the machine and by a second movable stream-guiding wall which faces the first stream-guiding wall and is also as wide as the machine; and at least one of the first and the second stream-guiding walls changes, at least at one point not directly located at the pulp stock discharge gap, from a surface not touched by the pulp stock.

Such a breast box nozzle or head box for delivering a stream of pulp stock which is as wide as the machine is known from German Patent 29 42 966 = U.S. Pat. No. 4,326,916. In this design, at the end of the pulp stock duct facing the gap a shutter is provided which has the shape of a flat strip supported on the free face of the movable stream-guiding wall. With the aid of numerous adjusting elements distributed over the width of the machine the shutter is supported so that it can be shifted, transversely to the pulp stock discharge gap, along the face of the movable upper stream-guiding wall. It is positioned so that it forms a relatively large angle with the plane of the stream-guiding wall and dips several millimeters deep into the pulp stock stream in such a manner that it reduces the cross section of the pulp stock duct. In cooperation with the stationary lower stream-guiding wall the free edge of the shutter, facing away from the upper stream-guiding wall, limits the size of the stream discharge gap.

Because of its known advantages as an element in devices for adjusting the basis weight/cross section, this shutter has been adopted widely. In this known embodiment, damages to and soiling of the surfaces of the shutter surfaces which come in contact with the pulp stock have, however, a very bad effect on the desired uniformity of the cross section Any damage to the edge of the shutter facing the gap therefore causes a local defect in the cross section causing the formation of streaks in the web. But it has also been observed that deposits are formed on the side of the shutter which is not touched by the pulp stock. These deposits consist of particles of fines and filler as well as of lime. These particles are contained in the spray mist which, in the area where the stream emerges from the breast box, is generated as a result of the turbulence in the stream and the dewatering of the pulp stock suspension which follows it immediately. The spray mist precipitated on the warm shutter therefore causes the formation of the deposits referred to above which build up in a short time. When these deposits on the side of the shutter that is not touched by the pulp stock come in contact with the surface of the pulp stock stream, this also causes defects in the cross section.

The defect referred to above occurs, of course, also on breast box nozzles whose stream-guiding wall is equipped at the pulp stock discharge gap with a fixed shutter. Such deposits are formed also on free surfaces, not touched by pulp stock, at the pulp stock discharge gap of breast boxes which comprise, for example, a stream-guiding wall designed as a control flap according to U.S. Pat. No. 4,406,740.

It is therefore the object of the invention to prevent deposits on the side of the stream-guiding wall which adjoins the pulp stock discharge gap and is not touched by pulp stock.

This object is realized by the head box comprising at least one of the first and the second stream-guiding walls comprises a device which extends at least partly across the width of the machine to discharge a fluid into a space which is located in front of a free surface not touched by the pulp stock.

The advantage of the solution is that the fluid forms a curtain in the space in front of the free surface at the pulp stock discharge gap, which curtain deflects the spray mist. This design, in an effective manner and at very low cost, protects the stream-guiding wall from deposits on the side not touched by pulp stock.

Useful embodiments of the invention are described in the subclaims.

The at least one fluid-containing pipe which runs along one of the first and the second stream-guiding walls and has an opening directed toward the free surface with the opening being drilled with holes and/or slots running in the longitudinal direction of the pipe. supplies the fluid and discharges it in the desired manner into the space in front of the free surface, so that the fluid can be effective there.

The device of the head box is located at the front or the back end of the second stream-guiding wall. the fluid is preferably applied in those areas of the stream-guiding wall in which the deposition process is particularly pronounced. In order to protect the stream-guiding wall from deposits also in the areas which are to a lesser extent exposed to the spray mist, it is useful, in to extend the device for supplying fluid over the entire width of the machine.

In a breast box whose stream-guiding wall comprises at the pulp stock exit gap a shutter over which a claw reaches on the side not touched by the pulp stock and whose cross section is curved between its front face facing away from the shutter and the shutter, the Coanda effect can in a useful manner be utilized in the bead box comprising at least one shutter for limiting the second stream-guiding wall at the stream discharge gap which comprises the free surface not touched by the pulp stock and on its side not touched by the pulp stock, is overlapped by a claw with a cross section rounded between its surface facing away from the shutter and the shutter, and wherein the pipe extends in the front of the claw and, for the delivery of the fluid, is at least approximately tangential to a curve of said claw. in order to bring the fluid in front of the shutter. The pipe used to supply the fluid can also be located at a certain distance from the shutter, which makes it easier to visually inspect the side of the shutter that is not touched by the pulp stock.

In a breast box with a claw, as mentioned above, which reaches over the shutter on its side not touched by the pulp stock, which claw comprises, on the side toward the shuttle, a hollow space for receiving a fluid, the discharge of the fluid, can take place from said hollow space into the space in front of the free surface of the shutter. In this case no separate pipe is required for supplying the fluid.

Several embodiments of the invention will be explained below in more detail with the aid of the drawings.

Figure 1:
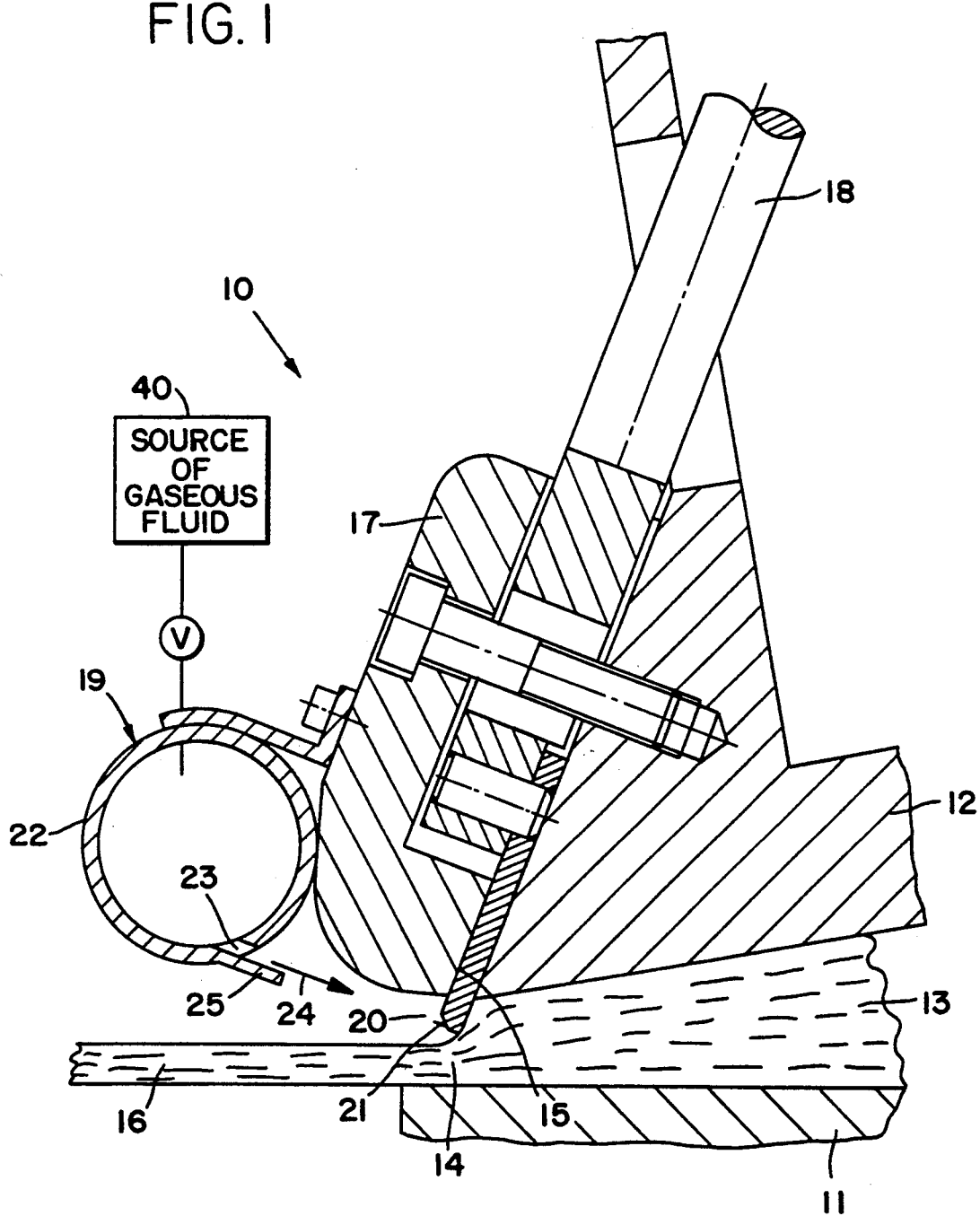
FIG. 1 shows a section of the around the pulp stock discharge gap of a breast box, with a device for discharging a fluid into the space in front of a shutter, as first embodiment, FIG. 2 a cross section similar to FIG. 1, but with a device utilizing the Coanda effect, as second embodiment, and FIG. 3 also a cross section similar to FIG. 1 with a claw which reaches over the shutter and comprises a hollow space from which fluid is discharged into the space in front of the shuttle, as third embodiment.

A breast box for a paper machine, indicated in FIG. 1 by reference numeral 10, comprises a lower, rigid stream-guiding wall 11 which extends over the width of the machine (perpendicularly to the plane of the drawing). Coordinated with wall 11 and facing it is a second stream-guiding wall 12, which is as wide as the machine and is movable relative to wall 11. The two stream-guiding walls 11 and 12 define a nozzle-like pulp stock duct 13, as wide as the machine, which forms at its end pulp stock discharge gap 14, as wide as the machine. The opening of this gap is limited by shutter 15 supported by the surface of the movable stream-guiding wall 12, which is not touched by the pulp stock. The purpose of breast box 10 is to accelerate in pulp stock duct 13 a suspension of pulp stock, which is supplied at a constant rate of volume and with a constant solids content, and to discharge it in the form of pulp stock flow 16, as wide as the machine, through discharge gap 14 onto a dewatering sieve (not shown) of the paper machine.

Shutter 15, in the form of a strip which is as wide as the machine and of small thickness, is overlapped by claw 17 (or by several claws placed one after the other across the width of the machine) which is screwed to stream-guiding wall 12. In addition, a multiplicity of adjusting means 18 which have the form of spindles and are distributed over the width of the machine act on shutter 15. By means of these spindles the opening of the pulp stock discharge gap 14 can be adjusted in relation to movable stream-guiding wall 12 by shifting shutter 15 which dips several millimiters deep into pulp stock duct 13.

Movable stream-guiding wall 12 is equipped with device 19 for discharging a fluid into space 20 in front of free surface 21, not touched by the pulp stock, of shuttle 15 in order to prevent the spray mist from forming deposits on surface 21. Device 19 comprises pipe 22 which extends over the width of the machine and is fastened to claw 17. On the side facing the shutter, pipe 22 has openings 23 in the shape of holes or slots which are located side by side over the entire width of the machine. The fluid arriving through pipe 22 is discharged through the openings 23 in the direction of arrow 24. Guiding piece 25 attached to pipe 22 next to the openings 23 aids in discharging the fluid in the desired direction. This fluid fills space 20 in front of free surface 21, not touched by the pulp stock, of shutter 15 and prevents spray mist from reaching the shutter.

In the practical execution of this first embodiment, the desired result can be obtained by means of a pipe 22 with an internal diameter of 80 mm to which air is supplied from both ends. If the openings 23 consist of slots which are 0.5 mm wide and extend in the longitudinal direction of the pipe, the air which is pumped through pipe 22 with a velocity of 0.8 m/sec will escape from the slot with a velocity of 2 m/sec. If device 19 consists of pipe segments with a length of 1 m each and their own air supply, it is sufficient, if the air velocity in the pipe and the width of the slots remain the same, if the inside diameter of the pipe is as little as 40 mm. If the openings 23 in pipe 22 are drill holes, they must be spaced 15 mm apart and have a diameter of 3 mm in order to obtain the same effect.

As mentioned before, the fluid is preferably air. Its condition (moist or dry, warm or cold) can be adapted to specific circumstances. If the pulp stock suspension is at a higher temperature, it may, for example, be desirable to supply warm air to device 19. Steam may also be a suitable fluid. Device 19, which is known as a gaseous fluid containing duct, receives gaseous fluid from source 40.

Figure 2:
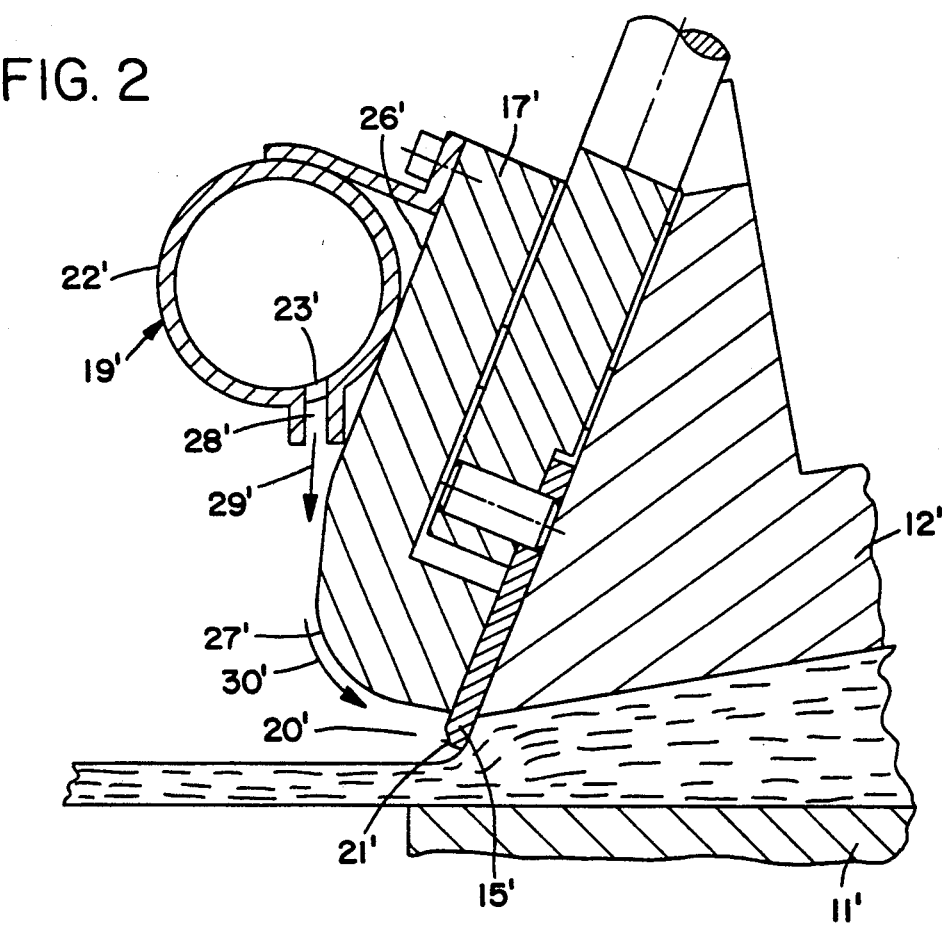

In a modification of the first embodiment described above, in which device 19 extends over the entire width of the machine, it may be sufficient if the pipes of the device are located only at the front and the back ends of the shutter. As more material is deposited there than in the middle part of the shutter, such a design of the device may suffice for dispensing fluid when conditions are less critical. In the second embodiment of the device shown in FIG. 2, shutter 15', on its side not touched by the pulp stock, is overlapped at the movable stream-guiding wall 12' by claw 17' designed in a manner different from that of FIG. 1. Claw 17' which, as in FIG. 1, is screwed to movable stream-guiding wall 12', has between its front face 26' facing away from the shutter and shutter 15' a rounded-off cross section (curve 27'). Device 19' for supplying a fluid is attached to the area of claw 17' which faces away from the shutter. Device 19' also comprises pipe 22' whose width is equal to that of the machine and which is provided with openings 23' consisting either of holes located next to each other in the longitudinal direction of the pipe or of slots oriented in the longitudinal direction of the pipe. Nozzle 28', directed toward curve 27' of claw 17', is associated with the openings 23'. The fluid fed into pipe 22' is discharged from the openings 23' and nozzle 27' in the direction of arrow 29' tangentially to curve 27' of claw 17'. The fluid follows curve 27' in accordance with the Coanda effect and flows in the direction of arrow 30' into space 20' in front of the free surface 21', untouched by the pulp stock, of shutter 15'. This prevents spray mist from entering this space 20'. By placing pipe 22' into the area located in front of claw 17' and facing away from the shutter, visual observation of the free shutter surface 21', untouched by the pulp stock, is made easier while feeding the fluid into space 20' located in front of shutter 15' is made easier.

In this embodiment, too, device 19', as is the case in embodiment 1, can consist of segmented pipes with separate fluid supply, or of pipes which are provided only at the front and the back ends of the shutter.

Figure 3:
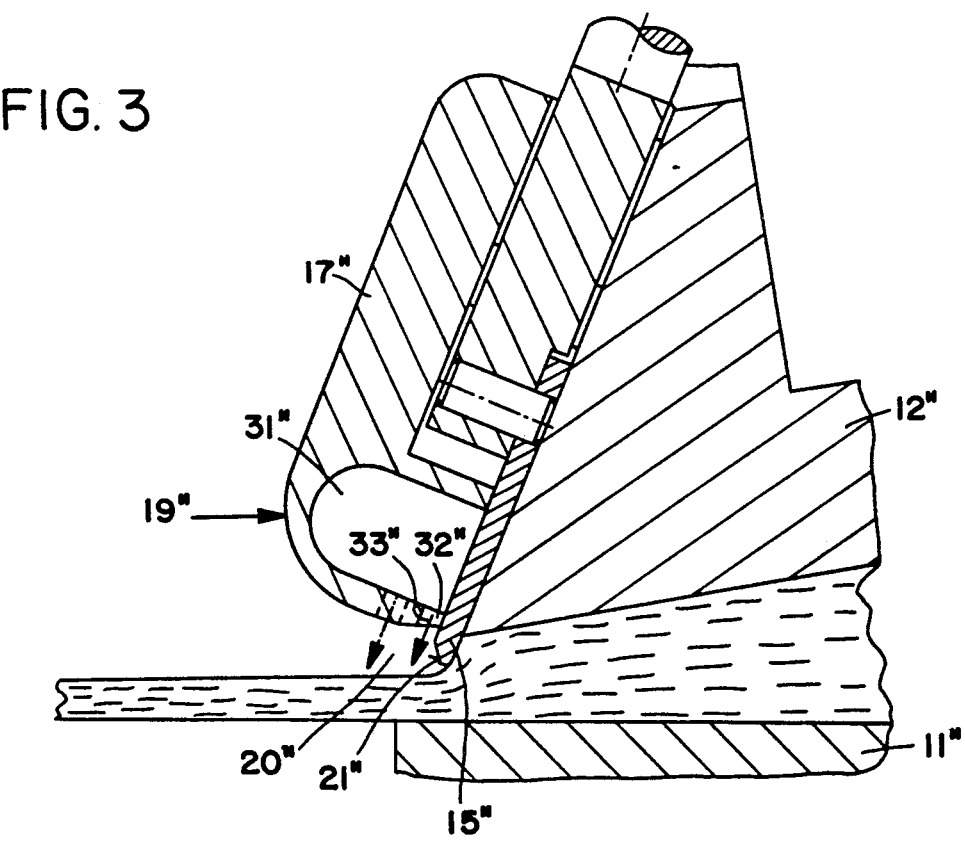

In the third embodiment of the device shown in FIG. 3, shutter 15", on its side not touched by the pulp stock, is overlapped by claw 17" also attached to movable stream-guiding wall 12". This claw 17" comprises, on the side facing the shutter, hollow space 31" for receiving a fluid. Instead of the pipe which is in the two preceding embodiments located in front of the claw, device 19" for discharging the fluid into space 20" in front of the surface 21", not touched by the pulp stock, is here integrated with claw 17". Claw 17" has openings 32" which are distributed over the width of the machine and connect hollow space 31" with the space in front of the free shutter surface 21″. These openings 32″, which can be holes, slots and/or ducts, are located immediately in front of shutter 15″. The fluid is discharged in the direction of arrow 33″ into space 20″ in front of the free shuttle surface 21″. But these openings 32″ may also, as indicated by dot-dash lines, be located at a certain distance in front of shutter 15″. Hollow space 31″ can also be segmented or be provided only in the two end sections of shutter 15″.

I claim:

1. In a paper machine, a head box comprising:
(a) a first and a second machine-wide stream-guiding walls with the first and second walls facing each other, the first and second machine-wide stream-guiding walls defining a nozzle-like and machine-wide pulp stock duct which forms a machine-wide pulp stock discharging gap which discharges a pulp stream in a direction;
(b) at least one of the first and second stream-guiding walls having a surface not touched by the pulp stock, the surface being located close to the pulp stock discharging gap;
(c) a source consisting of gaseous fluid connected to at least one gaseous fluid containing duct which extends at least partly across the width of the machine, the at least one gaseous fluid containing duct having a plurality of openings adapted to discharge a fluid onto the surface in a direction opposite to the direction of the pulp stream; and
at least one shutter for limiting one of the first and the second stream-guiding walls at the stream discharge gap and a claw, wherein the shutter comprises the surface and the claw is positioned to overlap the shutter on a side not touched by the pulp stock, the claw having a cross section which is rounded between its surface facing away from the shutter and the shutter, and wherein the duct is positioned and arranged for delivery of the gaseous fluid in a direction towards the shutter.

2. In a paper machine, a head box comprising:
(a) a first and a second machine-wide stream-guiding walls with the first and second walls facing each other, the first and second machine-wide stream-guiding walls defining a nozzle-like and machine-wide pulp stock duct which forms a machine-wide pulp stock discharging gap which discharges a pulp stream in a direction;
(b) at least one of the first and second stream-guiding walls having a surface not touched by the pulp stock, the surface being located close to the pulp stock discharging gap;
(c) a source consisting of gaseous fluid connected to at least one gaseous fluid containing duct which extends at least partly across the width of the machine, the at least one gaseous fluid containing duct having a plurality of openings adapted to discharge a fluid onto the surface in a direction opposite to the direction of the pulp stream; and
(d) at least one shutter for limiting one of said two stream-guiding walls at the stream discharge gap and a claw, wherein the shutter comprises the surface and the claw is positioned to overlap the shutter on a side not touched by the pulp stock, the claw and the shutter partially defining a hollow space for receiving the fluid on the side, and wherein the claw comprises said at least one gaseous fluid containing duct which includes the plurality of openings which connect the hollow space and a space in front of the surface of the shutter.

* * * * *